(12) United States Patent
Primm (10) Patent No.: US 8,566,292 B2
(45) Date of Patent: Oct. 22, 2013

(54) METHOD AND SYSTEM FOR JOURNALING AND ACCESSING SENSOR AND CONFIGURATION DATA

(75) Inventor: Michael Primm, Austin, TX (US)

(73) Assignee: Schneider Electric IT Corporation, West Kingston, RI (US)

(*) Notice: Subject to any disclaimer, the term of this patent is extended or adjusted under 35 U.S.C. 154(b) by 1075 days.

(21) Appl. No.: 10/898,112

(22) Filed: Jul. 23, 2004

(65) Prior Publication Data

US 2004/0260674 A1 Dec. 23, 2004

Related U.S. Application Data

(63) Continuation-in-part of application No. 10/824,169, filed on Apr. 14, 2004.

(60) Provisional application No. 60/462,847, filed on Apr. 14, 2003.

(51) Int. Cl.
*G06F 7/00* (2006.01)
*G06F 17/30* (2006.01)

(52) U.S. Cl.
USPC .......................... 707/694; 707/802; 707/803

(58) Field of Classification Search
USPC .............. 707/1, 999.204, 694, 781, 802, 803, 707/804; 710/22
See application file for complete search history.

(56) References Cited

U.S. PATENT DOCUMENTS

| | | | |
|---|---|---|---|
| 3,810,138 A | 5/1974 | Thompson et al. | |
| 4,349,879 A | 9/1982 | Peddie et al. | |
| 4,521,645 A | 6/1985 | Carroll | |
| 4,535,598 A | 8/1985 | Mount | |
| 4,568,934 A | 2/1986 | Allgood | |
| 4,636,652 A | 1/1987 | Raes | |
| 4,637,020 A | 1/1987 | Schinabeck | |
| 4,650,347 A | 3/1987 | Shigemura et al. | |
| 4,668,939 A | 5/1987 | Kimura et al. | |
| 4,718,025 A | 1/1988 | Minor et al. | |
| 4,747,041 A | 5/1988 | Engel et al. | |
| 4,751,648 A | 6/1988 | Sears, III et al. | |
| 4,816,208 A | 3/1989 | Woods et al. | |
| 4,823,290 A | 4/1989 | Fasack et al. | |
| 4,964,065 A | 10/1990 | Hicks et al. | |

(Continued)

FOREIGN PATENT DOCUMENTS

| | | |
|---|---|---|
| AU | 3855395 A1 | 6/1996 |
| AU | 5601198 A1 | 7/1998 |

(Continued)

OTHER PUBLICATIONS

Rajeev Rastogi et al. Improving Predictability of Transaction Execution Times in Real-time Databases. Pub. In Real-time systems, 19, 283-302 (2002).*

(Continued)

*Primary Examiner* — Vincent F Boccio
(74) *Attorney, Agent, or Firm* — Lando & Anastasi, LLP (57) ABSTRACT

The disclosure is directed to a system including a processor, a sensor interface responsive to the processor and memory responsive to the processor. The memory includes program instructions operable to direct the processor to implement a kernel-mode device driver for manipulating a journal based data system associated with data received via the sensor interface.

22 Claims, 6 Drawing Sheets

(56) References Cited

U.S. PATENT DOCUMENTS

| | | |
|---|---|---|
| 5,043,807 A | 8/1991 | Rabii |
| 5,061,916 A | 10/1991 | French et al. |
| 5,086,385 A | 2/1992 | Launey et al. |
| 5,097,328 A | 3/1992 | Boyette |
| 5,109,278 A | 4/1992 | Erickson et al. |
| 5,153,837 A | 10/1992 | Shaffer et al. |
| 5,157,732 A | 10/1992 | Ishii et al. |
| 5,189,394 A | 2/1993 | Walter et al. |
| 5,216,623 A | 6/1993 | Barrett et al. |
| 5,218,623 A | 6/1993 | Barrett et al. |
| 5,220,522 A | 6/1993 | Wilson et al. |
| 5,225,997 A | 7/1993 | Lederer et al. |
| 5,229,850 A | 7/1993 | Toyoshima |
| 5,262,758 A | 11/1993 | Nam et al. |
| 5,289,275 A | 2/1994 | Ishii et al. |
| 5,367,670 A | 11/1994 | Ward et al. |
| 5,382,943 A | 1/1995 | Tanaka |
| 5,395,042 A | 3/1995 | Riley et al. |
| 5,400,246 A | 3/1995 | Wilson et al. |
| 5,404,136 A | 4/1995 | Marsden |
| 5,475,364 A | 12/1995 | Kenet |
| 5,488,430 A | 1/1996 | Hong |
| 5,491,511 A | 2/1996 | Odle |
| 5,508,941 A | 4/1996 | Leplingard et al. |
| 5,528,507 A | 6/1996 | McNamara et al. |
| 5,548,659 A | 8/1996 | Okamoto |
| 5,553,609 A | 9/1996 | Chen et al. |
| 5,561,476 A | 10/1996 | Kershaw et al. |
| 5,566,339 A | 10/1996 | Perholtz et al. |
| 5,572,195 A | 11/1996 | Heller et al. |
| 5,581,478 A | 12/1996 | Cruse et al. |
| 5,586,202 A | 12/1996 | Ohki et al. |
| 5,588,067 A | 12/1996 | Peterson et al. |
| 5,589,764 A | 12/1996 | Lee |
| 5,602,585 A | 2/1997 | Dickinson et al. |
| 5,621,662 A | 4/1997 | Humphries et al. |
| 5,634,002 A | 5/1997 | Polk et al. |
| 5,652,879 A * | 7/1997 | Harris et al. ................ 707/101 |
| 5,659,470 A | 8/1997 | Goska et al. |
| 5,664,202 A | 9/1997 | Chen et al. |
| 5,715,160 A | 2/1998 | Plotke |
| 5,731,832 A | 3/1998 | Ng |
| 5,732,074 A | 3/1998 | Spaur et al. |
| 5,742,762 A | 4/1998 | Scholl et al. |
| RE35,793 E | 5/1998 | Halpern |
| 5,768,430 A | 6/1998 | Takashima et al. |
| 5,778,168 A | 7/1998 | Fuller |
| 5,798,798 A | 8/1998 | Rector et al. |
| 5,805,458 A | 9/1998 | McNamara et al. |
| 5,812,055 A | 9/1998 | Candy et al. |
| 5,818,725 A | 10/1998 | McNamara et al. |
| 5,822,302 A | 10/1998 | Landry Jr. et al. |
| 5,826,253 A * | 10/1998 | Bredenberg ................ 707/2 |
| 5,829,130 A | 11/1998 | Miller |
| 5,870,575 A | 2/1999 | Kahle et al. |
| 5,892,440 A | 4/1999 | Bryan |
| 5,905,867 A | 5/1999 | Giorgio et al. |
| 5,924,098 A * | 7/1999 | Kluge ...................... 707/100 |
| 5,926,210 A | 7/1999 | Hackett et al. |
| 5,937,092 A | 8/1999 | Wootton et al. |
| 5,937,097 A | 8/1999 | Lennon |
| 5,949,974 A | 9/1999 | Ewing et al. |
| 5,950,211 A | 9/1999 | Shealy |
| 5,955,946 A | 9/1999 | Beheshti et al. |
| 5,963,457 A | 10/1999 | Kanoi et al. |
| 5,968,116 A | 10/1999 | Day, II et al. |
| 5,974,237 A | 10/1999 | Shurmer et al. |
| 5,978,594 A | 11/1999 | Bonnell et al. |
| 5,978,912 A | 11/1999 | Rakavy et al. |
| 5,987,614 A | 11/1999 | Mitchell et al. |
| 5,991,775 A * | 11/1999 | Beardsley et al. ............ 707/205 |
| 5,991,885 A | 11/1999 | Chang et al. |
| 6,001,065 A | 12/1999 | DeVito |
| 6,052,750 A | 4/2000 | Lea |
| 6,055,480 A | 4/2000 | Nevo et al. |
| 6,057,834 A | 5/2000 | Pickover |
| 6,058,434 A | 5/2000 | Wilt et al. |
| 6,078,253 A | 6/2000 | Fowler |
| 6,081,606 A | 6/2000 | Hansen et al. |
| 6,085,243 A | 7/2000 | Fletcher et al. |
| 6,088,816 A | 7/2000 | Nouri et al. |
| 6,094,676 A | 7/2000 | Nolet et al. |
| 6,100,806 A | 8/2000 | Gaukel |
| 6,104,755 A | 8/2000 | Ohara |
| 6,105,061 A | 8/2000 | Nakai |
| 6,108,782 A | 8/2000 | Fletcher et al. |
| 6,112,235 A | 8/2000 | Spofford |
| 6,115,468 A | 9/2000 | De Nicolo |
| 6,122,603 A | 9/2000 | Budike, Jr. |
| 6,122,750 A | 9/2000 | Hayasaka |
| 6,125,145 A | 9/2000 | Koyanagi et al. |
| 6,138,078 A | 10/2000 | Canada et al. |
| 6,138,249 A | 10/2000 | Nolet |
| 6,139,177 A | 10/2000 | Venkatraman et al. |
| 6,144,770 A | 11/2000 | Lennon |
| 6,148,262 A | 11/2000 | Fry |
| 6,157,943 A | 12/2000 | Meyer |
| 6,160,584 A | 12/2000 | Yanagita |
| 6,160,926 A | 12/2000 | Dow et al. |
| 6,167,406 A | 12/2000 | Hoskins et al. |
| 6,170,007 B1 | 1/2001 | Venkatraman et al. |
| 6,173,323 B1 | 1/2001 | Moghe |
| 6,175,866 B1 | 1/2001 | Holloway et al. |
| 6,175,927 B1 | 1/2001 | Cromer et al. |
| 6,177,884 B1 | 1/2001 | Hunt et al. |
| 6,182,094 B1 | 1/2001 | Humpleman et al. |
| 6,182,157 B1 | 1/2001 | Schlener et al. |
| 6,189,109 B1 | 2/2001 | Sheikh et al. |
| 6,195,018 B1 | 2/2001 | Ragle et al. |
| 6,208,261 B1 | 3/2001 | Olstead |
| 6,208,345 B1 | 3/2001 | Sheard et al. |
| 6,215,404 B1 | 4/2001 | Morales |
| 6,219,628 B1 | 4/2001 | Kodosky et al. |
| 6,229,429 B1 | 5/2001 | Horon |
| 6,236,332 B1 | 5/2001 | Conkright et al. |
| 6,246,780 B1 | 6/2001 | Sato |
| 6,259,956 B1 | 7/2001 | Myers et al. |
| 6,266,721 B1 | 7/2001 | Sheikh et al. |
| 6,271,845 B1 | 8/2001 | Richardson |
| 6,281,790 B1 | 8/2001 | Kimmel et al. |
| 6,282,546 B1 | 8/2001 | Gleichauf et al. |
| 6,298,144 B1 | 10/2001 | Pucker, II et al. |
| 6,298,290 B1 * | 10/2001 | Abe et al. .................... 701/32.2 |
| 6,304,900 B1 | 10/2001 | Cromer et al. |
| 6,311,105 B1 | 10/2001 | Budike, Jr. |
| 6,311,214 B1 | 10/2001 | Rhoads |
| 6,324,644 B1 | 11/2001 | Rakavy et al. |
| 6,324,654 B1 | 11/2001 | Wahl et al. |
| 6,329,792 B1 | 12/2001 | Dunn et al. |
| 6,332,202 B1 | 12/2001 | Sheikh et al. |
| 6,336,175 B1 | 1/2002 | Shaath et al. |
| 6,338,094 B1 | 1/2002 | Scott et al. |
| 6,353,834 B1 * | 3/2002 | Wong et al. .................. 707/202 |
| 6,360,255 B1 | 3/2002 | McCormack et al. |
| 6,363,421 B2 | 3/2002 | Barker et al. |
| 6,363,422 B1 | 3/2002 | Hunter et al. |
| 6,373,840 B1 | 4/2002 | Chen |
| 6,374,296 B1 | 4/2002 | Lim et al. |
| 6,375,614 B1 | 4/2002 | Braun et al. |
| 6,381,700 B1 | 4/2002 | Yoshida |
| 6,389,464 B1 | 5/2002 | Krishnamurthy et al. |
| 6,396,534 B1 | 5/2002 | Mahler et al. |
| 6,400,103 B1 | 6/2002 | Adamson |
| 6,400,996 B1 | 6/2002 | Hoffberg et al. |
| 6,402,691 B1 | 6/2002 | Peddicord et al. |
| 6,404,348 B1 | 6/2002 | Wilfong |
| 6,405,216 B1 | 6/2002 | Minnaert et al. |
| 6,421,660 B1 * | 7/2002 | Kirk, III ...................... 707/206 |
| 6,442,706 B1 * | 8/2002 | Wahl et al. .................. 714/6 |
| 6,449,745 B1 * | 9/2002 | Kim et al. .................... 714/739 |
| 6,477,667 B1 | 11/2002 | Levi et al. |
| 6,496,105 B2 | 12/2002 | Fisher et al. |
| 6,505,086 B1 | 1/2003 | Dodd, Jr. et al. |
| 6,510,350 B1 | 1/2003 | Steen, III et al. |

(56) References Cited

U.S. PATENT DOCUMENTS

| | | | |
|---|---|---|---|
| 6,529,230 B1 | 3/2003 | Chong | |
| 6,529,936 B1 | 3/2003 | Mayo et al. | |
| 6,553,336 B1 | 4/2003 | Johnson et al. | |
| 6,553,418 B1 | 4/2003 | Collins et al. | |
| 6,581,063 B1* | 6/2003 | Kirkman | 707/100 |
| 6,591,279 B1 | 7/2003 | Emens et al. | |
| 6,640,145 B2 | 10/2003 | Hoffberg et al. | |
| 6,681,787 B2 | 1/2004 | Tinsley et al. | |
| 6,714,977 B1 | 3/2004 | Fowler et al. | |
| 6,754,657 B2* | 6/2004 | Lomet | 707/8 |
| 6,754,743 B2* | 6/2004 | Maessen | 710/56 |
| 6,839,777 B1* | 1/2005 | Vrancic et al. | 710/22 |
| 6,990,513 B2 | 1/2006 | Belfiore et al. | |
| 7,010,662 B2* | 3/2006 | Aasheim et al. | 711/207 |
| 7,051,053 B2* | 5/2006 | Sinha | 707/999.204 |
| 7,051,096 B1 | 5/2006 | Krawiec et al. | |
| 7,207,041 B2 | 4/2007 | Elson et al. | |
| 7,287,046 B2* | 10/2007 | Bulka et al. | 707/999.202 |
| 2001/0005894 A1 | 6/2001 | Fukui | |
| 2001/0047213 A1 | 11/2001 | Sepe, Jr. | |
| 2001/0047410 A1 | 11/2001 | Defosse | |
| 2001/0052006 A1 | 12/2001 | Barker et al. | |
| 2001/0055965 A1 | 12/2001 | Delp et al. | |
| 2002/0003575 A1 | 1/2002 | Marchese | |
| 2002/0023258 A1 | 2/2002 | Elwahab et al. | |
| 2002/0041603 A1 | 4/2002 | Kato | |
| 2002/0043969 A1 | 4/2002 | Duncan et al. | |
| 2002/0071031 A1 | 6/2002 | Lord et al. | |
| 2002/0072868 A1 | 6/2002 | Bartone et al. | |
| 2002/0083378 A1 | 6/2002 | Nickels | |
| 2002/0152298 A1 | 10/2002 | Kikta et al. | |
| 2003/0098789 A1 | 5/2003 | Murakami et al. | |
| 2003/0099254 A1 | 5/2003 | Richter | |
| 2005/0015396 A1* | 1/2005 | Vu | 707/100 |

FOREIGN PATENT DOCUMENTS

| | | |
|---|---|---|
| AU | 0016673 A5 | 6/2000 |
| CA | 2300053-AA | 2/1999 |
| CA | 2310275-AA | 6/1999 |
| CA | 2328939-AA | 9/1999 |
| CN | 87100353 A | 9/1988 |
| CN | 1294350 A | 5/2001 |
| EP | 0444997 B1 | 2/1991 |
| EP | 0 591 585 B1 | 4/1994 |
| EP | 0738065 A1 | 3/1996 |
| EP | 0744112 A1 | 11/1996 |
| EP | 0859489 A2 | 1/1998 |
| EP | 0978780 A1 | 8/1998 |
| EP | 0917034 A1 | 10/1998 |
| EP | 0917034 B1 | 10/1998 |
| EP | 0963076 A3 | 5/1999 |
| EP | 0964551 A1 | 6/1999 |
| EP | 0 927 933 A2 | 7/1999 |
| EP | 0977112 A2 | 7/1999 |
| EP | 0956680 A1 | 11/1999 |
| EP | 1014622 A2 | 12/1999 |
| EP | 0 990 986 A | 4/2000 |
| EP | 0992100 A2 | 4/2000 |
| EP | 1002268 A1 | 5/2000 |
| EP | 1 009 130 A | 6/2000 |
| EP | 1032884 A1 | 9/2000 |
| EP | 1 049 291 A2 | 11/2000 |
| EP | 1115264 A2 | 12/2000 |
| EP | 1124301 A2 | 12/2000 |
| EP | 1 096 724 A | 5/2001 |
| EP | 1 150 188 A2 | 10/2001 |
| EP | 1142289 A1 | 10/2001 |
| EP | 1 178 628 A2 | 2/2002 |
| GB | 9826895 A | 1/1999 |
| GB | 9913682 A | 8/1999 |
| GB | 2335124 A | 9/1999 |
| GB | 2343036 A | 4/2000 |
| GB | 2344718 A | 6/2000 |
| GB | 2351205 A | 12/2000 |
| GB | 2344718 B | 1/2001 |
| GB | 2355163 A | 4/2001 |
| GB | 2359369 A | 8/2001 |
| HU | 9300145 U0 | 8/1993 |
| JP | 3099398 A2 | 4/1991 |
| JP | 5040889 A2 | 2/1993 |
| JP | 6105376 A2 | 4/1994 |
| JP | 6119581 A2 | 4/1994 |
| JP | 8307541 A2 | 11/1996 |
| JP | 11164035 A2 | 6/1999 |
| JP | 11219388 A2 | 8/1999 |
| JP | 2000092092 A2 | 3/2000 |
| JP | 2000134606 A2 | 5/2000 |
| JP | 2000151606 A2 | 5/2000 |
| JP | 2000-209204 A2 | 7/2000 |
| JP | 2000278773 A2 | 10/2000 |
| TW | 0443058 B | 6/2001 |
| TW | 0448349 B | 8/2001 |
| WO | WO-95/21506 | 8/1995 |
| WO | 199849820 | 11/1995 |
| WO | WO-96/15615 | 5/1996 |
| WO | WO-97/30879 | 8/1997 |
| WO | WO-98/01838 | 1/1998 |
| WO | WO-98/26541 | 6/1998 |
| WO | WO-99/08183 | 2/1999 |
| WO | WO 99/15950 | 4/1999 |
| WO | WO-99/27456 | 6/1999 |
| WO | WO-99/45445 | 9/1999 |
| WO | WO-00/35177 | 6/2000 |
| WO | WO-00/39724 | 7/2000 |
| WO | WO-00/54557 | 9/2000 |
| WO | WO-00/73866 A1 | 12/2000 |
| WO | WO-00/79500 A1 | 12/2000 |
| WO | WO-01/01366 A2 | 1/2001 |
| WO | WO-01/08396 | 2/2001 |
| WO | WO-01/27763 A1 | 4/2001 |
| WO | WO-01/57631 A1 | 8/2001 |
| WO | WO-01/61665 A2 | 8/2001 |
| WO | WO-01/69405 A1 | 9/2001 |
| WO | WO 01/69504 A1 | 9/2001 |
| WO | WO-01/79935 A1 | 10/2001 |
| WO | WO 01/57477 C1 | 11/2001 |
| WO | WO-01/82028 A2 | 11/2001 |
| WO | WO-01/93042 A2 | 12/2001 |
| WO | WO-01/93508 A1 | 12/2001 |
| WO | WO-01/97907 A2 | 12/2001 |
| WO | WO-01/99402 A2 | 12/2001 |
| WO | WO-02/01877 A1 | 1/2002 |
| WO | WO-02/11391 A2 | 2/2002 |
| WO | WO-01/69405 C1 | 3/2002 |
| WO | 0233980 A2 | 4/2002 |
| WO | WO-02/37280 A2 | 5/2002 |
| WO | WO-00/79500 C2 | 6/2002 |
| WO | WO-02/47044 | 6/2002 |
| WO | WO-02/47369 A1 | 6/2002 |
| WO | WO-02/48830 A2 | 6/2002 |
| WO | WO-02/49285 A1 | 6/2002 |

OTHER PUBLICATIONS

Axis Communications, "Axis 2400/2401 Administration Manual Version 1.1", www.axis.com/techsup/cam_2400/index.htm, version 1.1xx, part No. 16741, pp. 1-78, Jul. 1999.

Fossum, E.R., "CMOS Image Sensors: Electronic Camera-On-Chip", IEEE Transactions on Electron Devices, vol. 44, iss. 10, pp. 1689-1698, Oct. 1997.

Axis Communications, "Axis 200+and 240 Camera Server: User's Guide", www.axis.com/techsup/cam_servers/cam_240/index.htm, pp. 1-38, Jan. 1999.

Axis Communications, "Network Camera Developments Enable Live Web Imaging", Axis 2100 white paper, www.axis.com/products/videos/camera/domumentation.htm, pp. 1-12, Nov. 1999.

Sinetica Corp: "Newsletter, Issue One 99", Sinetica, UK, www.sinetica.co.uk, Feb. 1999, XP002160504, 4 pages.

Sinetica Corp: "Netcom TH. Advanced SNMP Agent with Web BroserSupport", Sinetica, UK, www.sinetica.co.uk, Apr. 2000, XP002160505, 2 pages.

(56) References Cited

OTHER PUBLICATIONS

Supplementary European Search Report for PCT/US2004011353 dated Apr. 24, 2007, 2 pgs.

International Search Report for Application No. PCT/US2004/11442 dated Jun. 27, 2007, 1 page.
EP examination report from EP Patent Application No. 04750093.9 dated Sep. 7, 2011.

* cited by examiner

METHOD AND SYSTEM FOR JOURNALING AND ACCESSING SENSOR AND CONFIGURATION DATA

CROSS-REFERENCE TO RELATED APPLICATION(S)

The present application is a continuation-in-part of U.S. patent application Ser. No. 10/824,169, filed Apr. 14, 2004, which claims priority to U.S. provisional application No. 60/462,847, filed Apr. 14, 2003, entitled "METHOD AND SYSTEM FOR JOURNALING AND ACCESSING SENSOR AND CONFIGURATION DATA," naming inventor Michael Primm, which applications are incorporated by reference herein in its entirety.

FIELD OF THE DISCLOSURE

The present disclosure relates generally to methods and systems for journaling and accessing sensor and configuration data.

BACKGROUND

Collection and processing of sensor readings and other data in typical limited resource systems presents a number of significant implementation problems. Typical limited resource systems have limited memory and processing capabilities. Often, data is collected and produced during interrupt processing on the system, and is subject to very rapid change. In many cases, the timeliness of these changes is critical, and the duration of significant changes may be very short (milliseconds are not uncommon). As a result, a number of serious design problems emerge in such systems for collecting and processing data.

For example, typical systems often have difficulty quickly and efficiently reporting new sensor readings to collection systems. In addition, typical systems are often unable to prevent short-term (millisecond range) updates, which may be significant, from being "missed" by processing code, such as code for implementing value thresholds, or for reporting value updates across a network. Furthermore, certain typical systems are unable to allow "slow running" code, such as notification routines for sending data through e-mail or FTP, to view data in a "stable" state, so that a set of related values can be reported or processed in a consistent state ("temporal integrity"). Also, these systems often have difficulty delivering multiple data values consistently to collection systems, so that processing code does not observe temporary data inconsistencies ("transactional integrity").

Many typical systems write and rewrite single data structures, typically with some sort of semaphore or other mutual exclusion mechanism, and rely on frequent polling by data monitoring applications to observe problems or report changes. Other systems work on a "process on update" model, where the act of updating the data also includes immediately calling the necessary processing code, so that the data update is handled, but limits how much processing can be done before another data update can be reported and handled.

Large scale data processing systems, such as distributed relational database systems (RDBMS), often face variations of problems, such as frequent update, multiple users with differing rates of processing, and significant integrity requirements. A common mechanism used to aid in addressing these problems in many DBMS systems is the use of a data journal. Unfortunately, such classic database systems are not suitable for limited resource monitoring systems for a number of reasons. First, they typically require large database applications, along with large amounts of file system based storage. Secondly, their client interfaces are exclusively "user-mode" useable as opposed to being useable by interrupt mode or kernel mode application code. Lastly, typical database systems lack the real-time to near real-time responsiveness needed both for data update and data access by limited resource monitoring system applications. Accordingly, there is a need for an improved system and method of accessing sensor and configuration data.

SUMMARY

In a particular embodiment, the disclosure is directed to a system including a processor, a sensor interface responsive to the processor and memory responsive to the processor. The memory includes program instructions operable to direct the processor to implement a kernel-mode device driver for manipulating a journal based data system associated with data received via the sensor interface.

In another embodiment, the disclosure is directed to a system including a memory including a plurality of variable definitions, a plurality of variable update records, and a plurality of context records. Each variable definition of the plurality of variable definitions has an associated variable and includes an oldest update field and a latest update field. Each variable update record has an associated variable and includes a variable value, a next update pointer, and a previous update pointer. The previous update pointer of a first variable update record associated with one variable points to the oldest update field of a variable definition associated with the one variable. The next update pointer of a second variable update record associated with the one variable points to the latest update field of the variable definition associated with the one variable. Each context record of the plurality of context records has an associated current timestamp field and a context update field pointing to a third variable update record of the plurality of variable update records.

In a further embodiment, the disclosure is directed to a method for accessing a value associated with a variable at a target time. The method includes searching a variable record table for a variable record. The variable record has a variable identification associated with the variable, a latest update pointer, a creation time not greater than the target time, and a latest update time. The method includes selectively searching a set of update records starting with a first update record indicated by the latest update pointer and following a previous update pointer included in the first update record to a subsequent update record.

In another embodiment, the disclosure is directed to a method for managing memory. The method includes determining an oldest timestamp of interest, searching a set of update records starting at a specified start point and proceeding chronologically to subsequent update records until identifying a first update record with a timestamp newer that the oldest timestamp of interest, setting the specified start point to the record chronologically following the first update record and revising a variable record associated with the first update record.

DETAILED DESCRIPTION

The present disclosure describes a method and system for utilization of data journaling techniques to produce a real-time sensor monitoring and data processing system suitable for use in embedded monitoring appliances or, alternatively, in systems, such as PCs and servers.

The term 'monitoring appliance', as used in this disclosure, generally refers to a low-cost computing device built to perform a well-defined set of functions centered around the acquisition and processing of analog and digital sensor readings. Unlike personal computers (PCs) and other large scale computing devices, monitoring appliances typically have limited storage and limited computing power. Storage generally includes RAM and Flash memory. In general, mechanisms for collecting and producing the sensor readings in an appliance involves significant interrupt mode and kernel mode processing unlike monitoring applications on PC devices. Applications on PC devices typically do the bulk of data collection and processing in processes in "user mode," where full operating system functionality is available. In particular examples, the monitoring appliance may include applications for alarming and data communication through networks using standards such as HTTP, FTP, SMTP, SMS, and SNMP.

The disclosure presents a memory and processing-based system for implementing a journaling style data model (which may not have a file system or high-level operating system functionality). A journal based data model includes a set of variable updates. Such a journaling style data model may be used on a monitoring appliance. In one particular embodiment, the journaling style data model may be implemented in a kernel mode or as a device driver. Kernel-mode generally includes running with supervisor privilege within the kernel of the operating system. Device driver generally includes a specialized piece of code, either integrated with or loaded by the operating system kernel, that runs with kernel privilege and provides a service or access to a hardware device. In one exemplary embodiment, the system provides interfaces for interrupt, kernel, and user mode update and access to the data model, including transactional data update (with rollback) from interrupt, kernel, and user mode. The system may also include access to stable "snapshots" of the state of the data model as of a given time without copying the data model. The system may provide support for step-by-step traversal of the update sequence for the data model, allowing even slow applications to avoid missing short-term data events. Each step in the traversal provides a stable view of the whole data model at the point in time in the data model's history that corresponds to the time of the last update read. The system may provide support for efficiently reclaiming journal space as accessing applications move past the older updates. The system may also provide mechanisms for defining named variables of various data types, as well as supporting "meta-data" for these variables.

Figure 1:
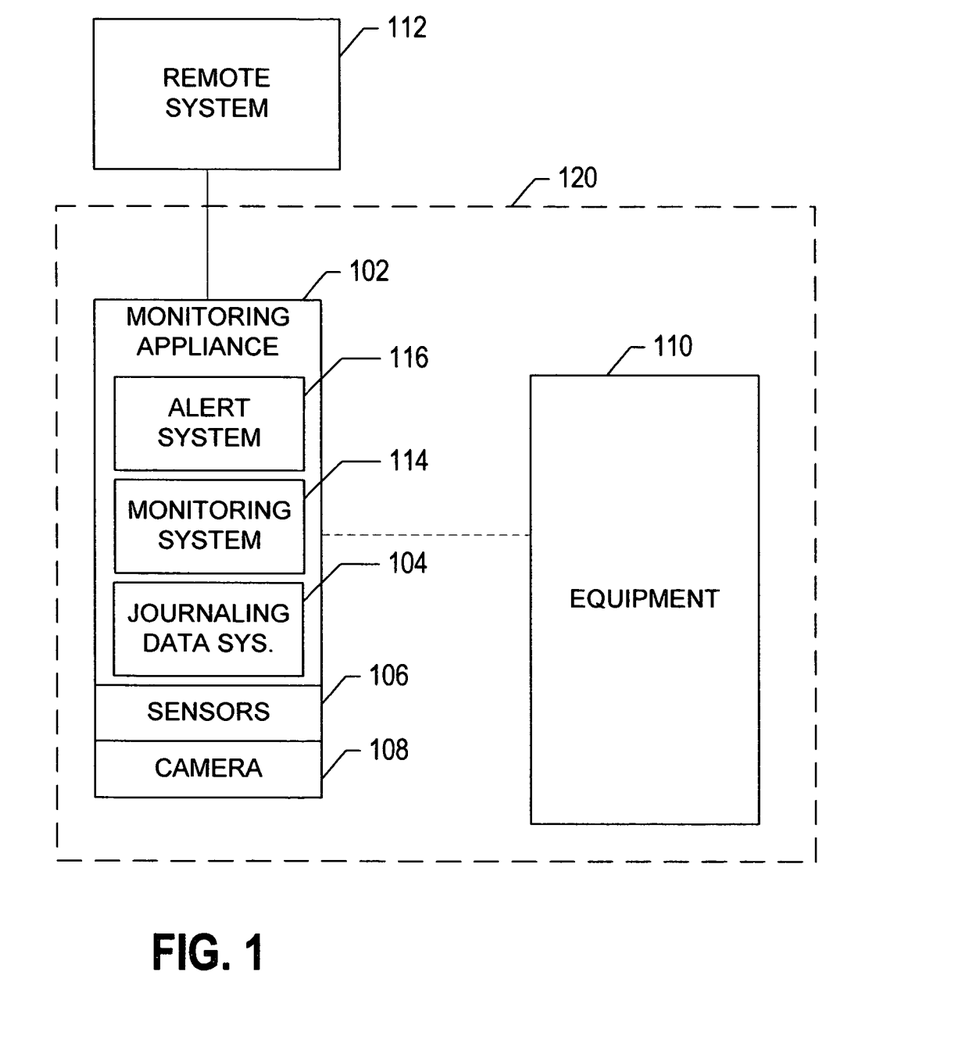
FIG. 1 is a block diagram depicting an exemplary monitoring system.

FIG. 1 depicts an exemplary monitoring system. A monitoring appliance 102 monitors a space 120 and, in some embodiments, equipment 110, such as computer equipment. The monitoring appliance 102 may communicate data associated with the space 120 and the equipment 110 to a remote system 112. For example, the monitoring appliance 102 may gather environmental data, such as temperature, air flow, humidity, leak detection, power quality, and motion detection.

The monitoring appliance 102 includes a journaling database system 104. The monitoring appliance 102 may also include or communicate with sensors 106 or cameras 108. The journaling system 104 may be a kernel-mode driver including a table of variable records, a plurality of variable updates, and a plurality of context records. The journaling system 104 may supply data to a monitoring system 114 that monitors data values and creates alert objects. The alert system 116 may interact with the journaling system 104 and the monitoring system 114 to act on data values and alert object, such as to notify responsible parties regarding threshold violations and alarm conditions.

Figure 2:
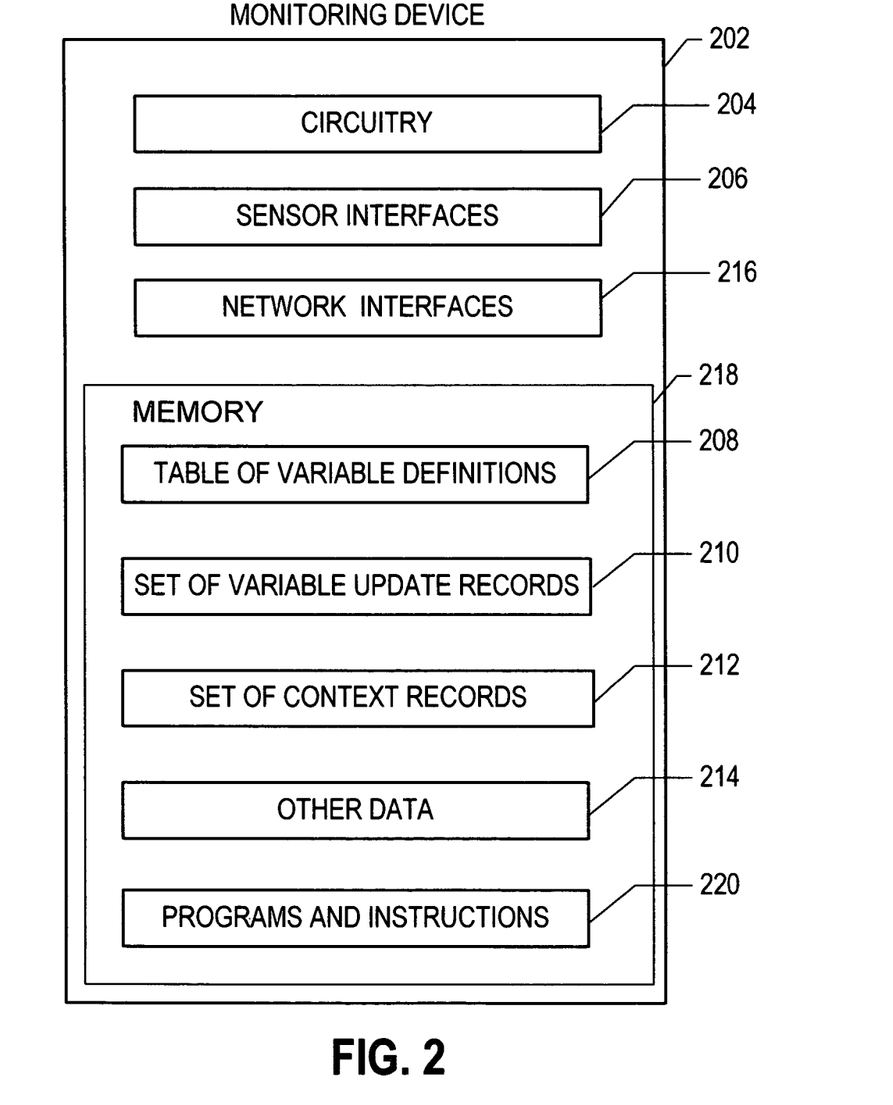
FIG. 2 is a block diagram depicting an exemplary embodiment of a monitoring device.

FIG. 2 depicts an exemplary monitoring appliance 202. The monitoring appliance 202 includes circuitry 204, sensor interfaces 206, network interfaces 216 and memory 218. Memory 218 includes a journaling database 222, various other data 214, and programs and software instructions 220. The journaling database 222 includes a table of variable definitions 208, a set of variable update records 210, a set of context records 212. The circuitry 204 performs logic functions, data gathering, and communications functions and may include a processor and other support circuitry.

The sensor interfaces 206 may interact with sensors, such as analog or digital sensors. For example, the sensor interfaces 206 may gather temperature, humidity, airflow, video, audio, dry-contact, and other data from specific sensors. Network interfaces 216 may provide communications connectivity. For example, the monitoring appliance may communicate with wired and wireless networks, such as Ethernet, telephony, Blue Tooth®, 802.11, 802.16 and other networks.

Memory 218 generally takes the form of random access memory (RAM) and flash memory. However, permanent data storage may be provided. The memory includes tables and record sets 208, 210, and 212, which form the base data structures for the journaling data model 222. The table of variable definitions 208 contains records describing data objects within the data model. In a particular implementation, these records are arranged in a hash table, such as a table hashed using the name of each variable, to allow fast lookup. For faster access, the records describing each variable may be fixed in memory, allowing a pointer or some other index to be used as a handle for accessing a variable.

The global set of variable update records 210, also referred to as a global journal, includes an ordered journal of updates, providing a history of the value updates of sensor values. Each update record is also a member of a variable-specific update set, allowing the value history for a given variable to be easily accessed. In one particular embodiment, the global set or global journal 210 is implemented as a next update pointer in each update record.

The set of context records 212 describes "views" into the data model for each of the applications accessing the data model. Each context record may include a pointer into the global update journal and a corresponding update timestamp. The pointer indicates where in the history of the data model the context is referring. Context records may also include support for filtering the view of the data, for example, by restricting the view to selected variables that are of interest.

Memory 218 may also include other data 214 such as threshold data, application data, video data, audio data, alert and alarm contact data, and other data objects associated with performing monitoring functionality. Memory 218 may also include computer-implemented programs 220 configured to direct circuitry 204 to provide functionality, such as, for example, data monitoring, alert and alarm functionality, data transfer, and network communications. For example, the programs 220 may include a data monitoring application with data objects useful in comparing data to threshold values and useful in determining alarm conditions. The programs and instructions 220 may further include applications configured to contact, notify or alert other systems and personnel when alarm conditions occur. The programs and instructions 220 may further include applications, such as web servers and email applications, for transferring or communicating information and data. For example, the programs and instructions 220 may be configured to direct the circuitry 204 to communicate via the network interfaces 216 using communications standards, such as FTP, SNMP, SMTP, HTTP, and SMS.

Each variable record in the data model defines a uniquely named entity, typically using a textual name, with a specific data type. In a particular embodiment, each sensor in the system has an associated variable for which the current value is the sensor reading. Other data, such as configuration, error conditions, status, and security settings can be stored as variables. An exemplary structure for a variable record is represented in Table 1.

The combination of the creation time and the time of the last update of a given variable is used to select from among the records that may exist for a given variable ID. If the variable is deleted, the time of the last update is the time of the deletion. Likewise, if no variable record existed at the desired time reference, which may be before or after the variable was created or destroyed, the lookup can recognize the absence of the variable record and act accordingly.

Each variable record may also include descriptive data, such as the data type, attribute flags, and class of the variable. In a particular embodiment, a significant variety of data types are supported, including signed and unsigned integers (32-bit and 64-bit), single and double precision floating point numbers, Booleans, strings, string lists, timestamps, byte arrays and structured data values, such as lists of other data value primitives with ID strings for each.

This exemplary embodiment also supports a variety of attribute flags including basic access control, such as a read-only flag, a constant flag, and an undeletable flag; name scope control, such as a flag indicating that the variable ID is globally unique across multiple systems or locally unique; and persistence control, such as a flag for indicating that the variable should be saved to permanent storage and restored when the system is restarted.

TABLE 1

Exemplary Data Structure ulong Magic_Number (indicates type of structure, and to verify pointers)
Char *ID_string (unique ID of variable)
Class_ptr Class (pointer to "class" of variable - use for categorization)
Enum vartype Type (enumeration describing which data type is used by the variable)
ulong Creation_timestamp (used to resolve between different copies of a variable that might exist due to the variable being destroyed and recreated)
priv Privilege (access privileges)
varupdate Oldest_Update (update record containing the oldest available value of the variable)
varupdate *Latest_Update (pointer to most recent value update of the variable)
varmeta *Metadata_List (pointer to list of metadata records, providing extra variable data)
Enum varflags Type_Flags (used for basic attributes (read-only, persistence))
variable *Next_Variable (used for linking the record into lists within the hash table)
ulong History_Time (setting for controlling how much value history to preserve, independent of journal length)
varhist *History_List (list of history records for holding values that have been removed from the journal but are still needed to support the History Time)

Figure 3:
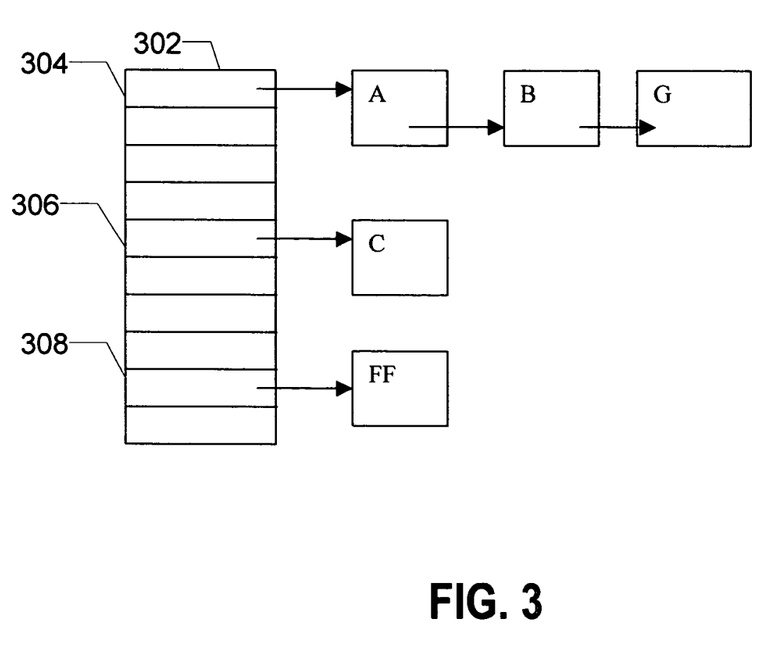
FIG. 3 is a block diagram depicting a table of variable records.

The variable records may be stored in or accessed via an open hash table, with the records hashed by the ID_string. As shown in FIG. 3, a hash table 302 may include records hashed by ID-string, such as records 304, 306, and 308. These records may point to update records with timestamps as indicated by records A, B, C, G, and FF.

Variable records referenced in the hash table may be uniquely identified by ID_string in combination with creation time. Creation time is useful in handling the situation in which a variable is deleted and recreated during the lifetime of the journal. When the hash table is searched for a variable, the lookup is relative to a desired time reference, for example, either the present time or the context used to view the data.

In an exemplary embodiment, each variable record also includes a variable update record. This variable update record stores the "oldest" value of the variable, which provides the base-line version of the variable. The updates contained in the journal are, generally, assumed to be relative to the base-line values stored in the variable records. For example, if no update is in the journal, or if the update is after the time in question, the "oldest" value embedded in the variable will be used to describe the value of the variable.

Variable values may be stored in variable update records. In one particular embodiment, each variable record consists of the fields depicted in Table 2.

TABLE 2

Exemplary Variable Record Fields variable *var - the variable that the updated value refers to
ulong update_time - the timestamp that the value update occurred
varvalue value - the updated value
varupdate *next_var_update - pointer to the next newer update for the same variable TABLE 2-continued Exemplary Variable Record Fields varupdate *prev_var_update - pointer to the next older update for the same variable
varupdate *next_global_update - pointer to the next newer update in the global journal Variable update records may be linked into two different ordered sets. One set represents the value history of the specific variable, such as through using the next_var_update and prev_var_update pointers, and the other set represents the global value history or global journal for the variables in the system. In both cases, the order of the records may be sorted by update timestamp with records "before" a given record having a timestamp equal to or lower than that of a given record, and records "after" a given record having a timestamp equal to or higher than that of the given record. This ordering is naturally produced due to the insertion process, since newer updates will have higher timestamps than older ones.

In general, references to "timestamp" in this disclosure are intended to refer to numeric values representing an ordered sequence of time in history. Depending upon the implementation, timestamps may be literal timestamps with sufficient resolution so that matching values can be considered by the system to be "simultaneous" or an incrementing "version stamp" where each atomic update or set of updates receives a new value which is higher than all previous values, such as by using an incrementing counter. In general, the mechanism used for producing timestamps should satisfy the following exemplary rules:

A single variable cannot have more than one update with a given timestamp value (i.e. any two updates for a given variable must have different timestamps).

Any two updates to two different variables that are not considered to have occurred simultaneously must have different timestamps, with the older of the two updates having a timestamp lower than the newer one.

Any two updates to two different variables that are considered to have occurred simultaneously must have the same timestamps.

Figure 4:
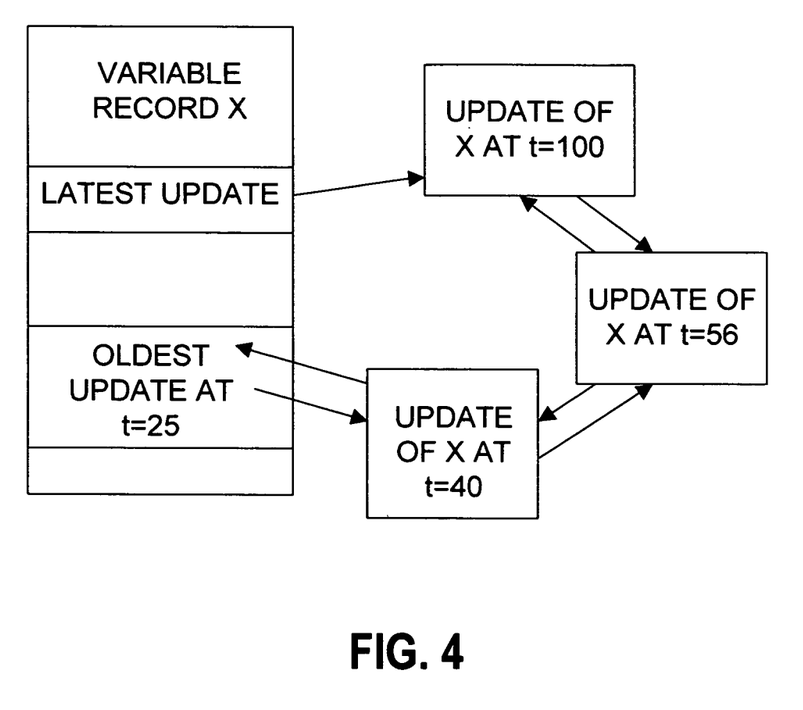
FIG. 4 is a block diagram depicting links between a variable record and update records.

For a given variable, the combination of the variable record and its update records form a doubly-linked circular list. For example, as shown in FIG. 4, a record for Variable X includes a Latest Update field that points to an Update Record at the most recent time, in this case t=100. The Update Record at t=100 points to the previous Update Record at t=56. The Update Record at t=56 points to the Update Record at t=100 and the Update Record at t=40. The Update Record at t=40 includes pointers directed at the Update Record at t=56 and the Oldest Update Record at t=25. The Oldest Update Record may be incorporated into the Variable Record X.

Figure 5:
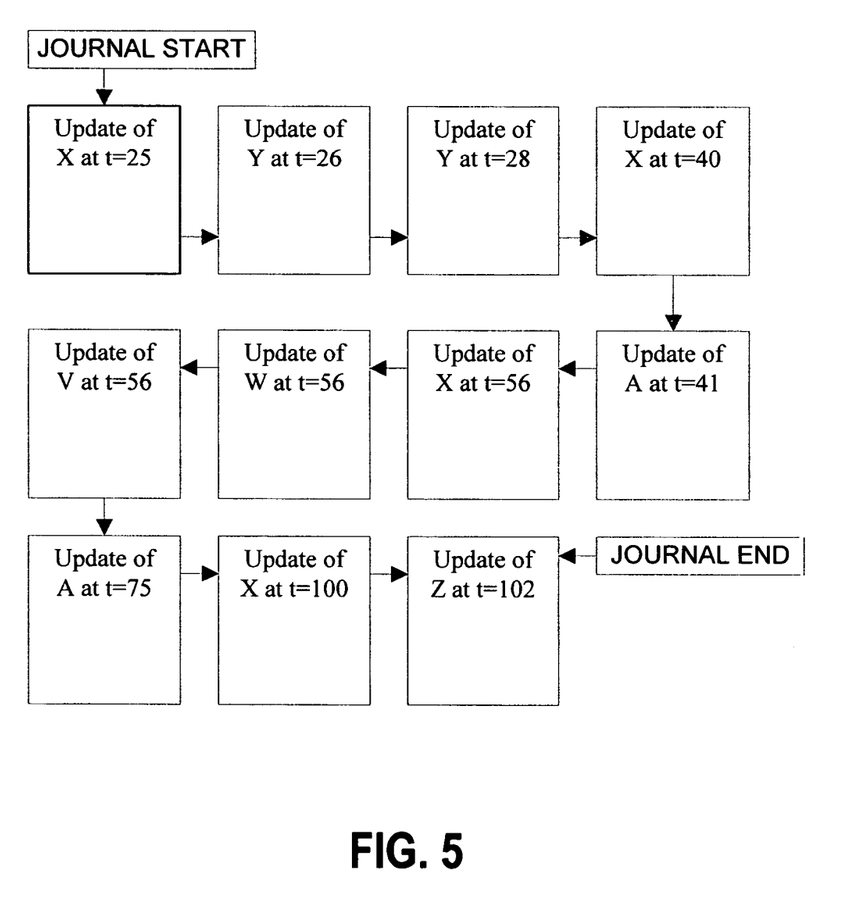
FIG. 5 is a block diagram illustrating a global update record set.

Similarly, the update records, including those embedded in the variable record, are linked and ordered into a single list, representing the global value journal for the whole data system. As shown in FIG. 5, the global journal start pointer indicates an update record with the oldest timestamp, in this case, the lowest time t=25. Each update record points to the next chronological update record. For example, an update record for a variable (X) at t=25 may point to an update record for a different variable (Y) at t=26. Similarly, an update record for a variable (Y) at t=26 may point to an update record for the same variable (Y) at t=28. Update records for different variables may have the same timestamp. The most recent update record is the journal end pointer, in this example, an update of variable Z at t=102.

In general, when the value of a variable is updated, a new update record is created and initialized with a new value, an appropriate timestamp, and pointer to the variable record. The new update is added to both the end of the global journal (using the "journal_end" pointer) and the newest end of the variables local set of values (using the 'latest update' pointer in the variable record). The simple structure of the journal allows this operation to be quickly accomplished, even in interrupt mode with, for example, protection provided by interrupt disables, spin locks, or other system appropriate mechanisms. If interrupt mode update and/or access is not used, semaphores can also be used for providing concurrency protection.

Since the value history of a variable is likely to be of interest, deletion of a variable is treated as a special case of a value update. A special reserved value is stored in the value field of the update record, indicating that the current value is now "deleted". When the variable is being accessed for its value at a given point in time, the search of the hash table can quickly determine that a given variable record did not exist at a given point in time by comparing the desired timestamp to the creation time and to the value and timestamp of the latest update. If the creation time is newer than the timestamp, the variable did not exist yet. If the value is 'deleted' and the timestamp is before the desired time, the variable no longer existed at that time.

Stable reader access to the data model and journal may be accomplished using data records known as 'access contexts'. In a particular implementation, an access context consists of the fields depicted in Table 3.

TABLE 3

Ulong current_ts - current timestamp of data being accessed through this
context
enum varflags Type_Flags_Mask - bit-mask for selecting which 'Type_Flags' bits are
required to match
enum varflags Type_Flags_Value - bit-mask for providing the values of the
bits of 'Type_Flags' which were selected by 'Type_Flags_Mask' (i.e.
Type_Flags AND Type_Flags_Mask == Type_Flags_Value for matching
variables)
varclass *class - class of variables which will match (null if any variable class
is OK)
varcontextmetafiler *meta_flt - list of metadata slot Ids and values which a
variable must match to be selected (null if no metadata slot restrictions)

TABLE 3-continued varupdate *next_update - pointer into journal to next update to be read/processed when reading updates sequentially: null if all updates have been read
varaccesscontext *next, *prev - pointers for listing all access contexts The current_ts field is used to provide a target time when the value of a variable is requested and to prevent pruning of updates. The minimum value of the current_ts field for active access contexts can be found, maintained, and used for setting the limit on what portion of the journal is pruned.

The 'next update' pointer is used to point directly into the update journal, allowing updates to be read, one by one, from the journal. When it is combined with the current_ts, the system can determine when more than one update occurred simultaneously. The updates can be read, one-by-one, and some may be found to have the same update timestamp.

In a particular implementation, the other fields (Type_Flags_Mask, Type_Flags_Value, cls, meta_flt) are used to "filter" the variables shown through the access context to only those of interest. Each of these fields, when defined, provides matching requirements for different fields in the variable record to be matched in order for a variable to be "of interest" to the access context. The other fields may be used to allow quick traversal of the update journal. Updates associated with variables not matching the filters are skipped without being reported to the reader of the access context.

Enumeration of the variable population and associated values at the given time represented by the access context may be accomplished by traversing the hash table of the variable records, skipping records representing variables that do not exist at the target time and records that do not match the access context's filters, and reading the values using the current timestamp as the target time. For large variable populations with frequent filtering, additional hashing or sorting of variable records with common filtered attributes may be performed to increase search efficiency.

Figure 6:
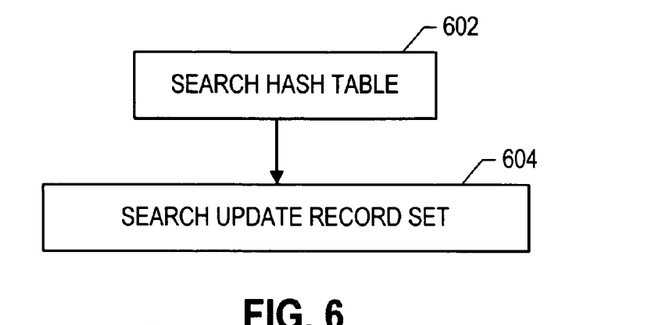
FIGS. 6 and 7 are flow diagrams illustrating exemplary methods for use by the system.

Accessing the value of a variable at a given time may be accomplished as shown in FIG. 6. As shown in step 602, the hash table is searched for the variable records to find the record with the matching ID for the variable and where the creation time is less-than-or-equal-to the target time, and where either the latest update value is not 'deleted' or the latest update time is greater-than-or-equal-to the target time. If no record is found, the variable does not exist. If found, the update record list is searched, starting at the update record pointed to by the 'latest update' pointer, until a record with a timestamp less-than-or-equal-to the target time is found, as shown in step 604. If found, this is the value of the variable at the target time. If the timestamp of the 'oldest' update record, for example, in the variable record itself, is greater-than the target time, the value at the target time is no longer in the journal.

In a particular embodiment, the update list for a given variable is a simple, double-linked list, which may be traversed linearly to find a value. Linear traversal is generally desirable where the length of the update history for a given variable is small, timestamp comparisons are very fast, and most value queries are for either the current value (the first in the list) or one of the most recent values (those closest to the start of the search). In implementations where these assumptions may be inappropriate, use of a heap, binary tree, or other data structure providing a faster-than-linear lookup may be used.

Since the access contexts consist of a very small set of data, contexts can be easily created or copied. One common use of access contexts is for threshold processing. Threshold processing code may operate either by reading updates, one by one, and checking for threshold violations on those variables of interest that are changing values or by skipping forward by prescribed periods of time, and traversing all desired data. Checking one by one prevents the need to poll all variables frequently since the threshold code can assume that a variable representing a sensor still has the same value as the last time it was read unless a new value update is reported. If a problem is found, it is commonly the case that another program, such as a notification process for sending e-mail or generating reports, is invoked. By copying the access context and passing the copy to the notification program, the system provides that the notification process reports on the same system state, including the same sensor values and other configuration data, as present at the time that the problem was reported. Meanwhile, the threshold processing code can continue to process newer data updates, without waiting for the notification code in order to preserve the data state, and without causing the notification code to potentially report "newer" system state than intended. When the notification process is completed, it can close or release the access context, allowing the system to prune the journal of the older updates that are no longer of interest.

Figure 7:
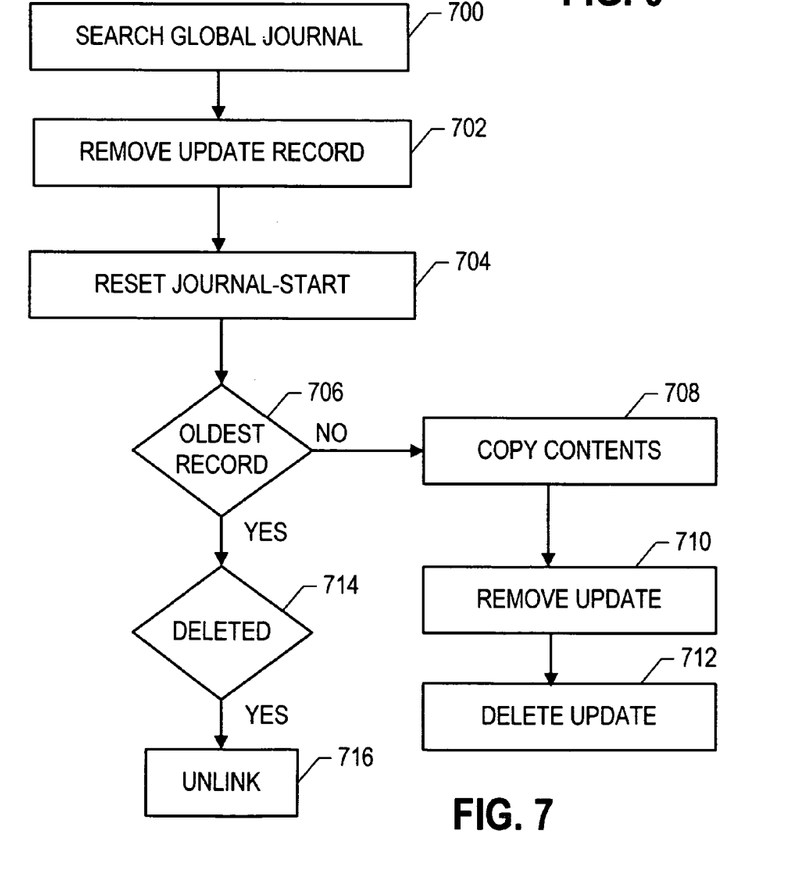

The journal supports being "pruned" based on retiring records in the journal older than the oldest timestamp of interest, as shown in FIG. 7. Starting at the "journal-start", each update record is checked until one is found that is newer than the oldest timestamp value still of interest, as shown at step 700. In one exemplary embodiment, the oldest timestamp would be indicated by the context record with the oldest current_ts field. As shown in step 702, the update record is removed from the journal. The journal-start is reset to the update record found after the record, as shown in step 704. The age of the record is determined, as shown in step 706. If the update record is not the oldest record for the given variable (based on comparing its pointer to the address of the "oldest" update record within the variable record owning the update record), the contents of the update record are copied into the "oldest" record, as shown in step 708, the update record is removed from the variable's update set, as shown in step 710, and the update record is deleted, as shown in step 712. If the record was the 'latest' for the variable, the 'latest' pointer is directed to the 'oldest' record within the variable record. If the update record is the oldest for the given variable, and the value is 'deleted', as shown in step 714, the variable record is unlinked from the variable hash table, as shown in step 716, and the variable record is deleted.

Pruning of the journal can be initiated for a variety of reasons, including closing of data model readers, resulting in changes in the oldest timestamp of interest; readers moving forward through the journal also causing such changes; or resource constraints, such as the population of update records exceeding a system prescribed limit or age limit.

Another use of data stabilization is for potentially long-running data processing, such as saving the variable data to disk or accessing the data across a network. The time-consistency gained by the access context allows the "slowness" of these mechanisms to not cause problems with their successful execution either by forcing the sensors and other data "updaters" to block or stop updating temporarily, or by requiring the production of a memory expensive copy of the data into fast storage, such as RAM, so that the slow processing can have a stable data image on which to operate. The option for such processes to "listen" for just the values that have been updated, by, for example, traversing the update journal, also allows for efficient incremental data communication such as only sending the data updates across a network, instead of a full copy of mostly-unchanged data.

Variable records also support a mechanism for providing additional "supporting data" for the variables. Such "metadata" provide a means by which additional information on the variables, such as units, value ranges, labels, access control, and other application-specific data can be "tied to" the variables.

In a particular implementation, each "metadata slot" is defined by a record containing the slot's ID string, its data type (supporting the same types as the variable data supports), and any access control information. Each "metadata slot value" contains a pointer to the record defining the slot, the value of the slot, and pointers for chaining with the other metadata slot values for a given variable.

Multi-update transactions may be implemented by accumulating a desired set of update records without adding them to the journal or the variables' update chains until the transaction is "committed". When committed, updates in the chain are given the same update timestamp, added to the global journal, and linked into each of the update chains for each of the update variables as if the updates were done one by one. Only the commit processing is performed within the "mutual exclusion" (interrupt disable or semaphore, as indicated earlier) section of the code. The transaction can be accumulated step-by-step without entering the critical section. Likewise, the transactions can be "rolled-back" by simply deleting the chain of updates before commit. Similarly, creation of new variable objects within a transaction is accomplished by accumulating the new variable records, and adding them (and setting the creation timestamp) when the commit is complete.

In a particular implementation, each variable can optionally be assigned to be of a certain class. Variable classes are defined by data structures that include a unique ID string, a pointer to a parent class (if any), access privileges, and a list of class-specific metadata values. Exemplary Classes are used in the following ways:

1. Variable classes can provide metadata slot values, which can be treated as the default value for any slots not specifically defined by a given variable. This allows significant memory savings when metadata is frequently used, and often common for different variables of the same class. Since classes support having "parent classes", this inheritance of slot values can be easily extended: new subclasses can provide overriding slot defaults while simply inheriting other defaults.
2. Classes and superclasses can be efficiently used for filtering among different variables when enumerating or when scanning updates using an access context, since the "instance-of" operation can be implanted by a simple "pointer compare" combined with a "tree walk" from the variables class, to its parent, etc.
3. Defining access control
4. Providing for registering listener functions, such as constructors, destructors, update verifiers, and update notifiers.

The exemplary implementation includes multiple access methods for the data model implementation. Exemplary methods of access include implementation of these functions:

1. Creating, updating, and deleting variables and their metadata
2. Defining data classes and metadata slots
3. Creating, copying, and deleting access contexts, and setting filters on those access contexts.
4. Enumerating and querying variables using an access context (or accessing the "current values" without one)
5. Watching and processing updates, step-by-step.

An exemplary implementation is based around a kernel-mode device driver and provides a set of C-callable function calls providing the full set of data model capabilities. A kernel-mode implementation generally means running with supervisor privilege within the kernel of the operating system. A device driver generally means a specialized piece of code, either integrated with or loaded by the operating system kernel, that run with kernel privilege and provides a service or access to a hardware device. These interfaces are designed to be called either from interrupt-context or task-mode, allowing their use from other kernel-mode device drivers and subsystems.

A particular exemplary implementation provides a character device driver interface, including a full set of ioctl( )-based functions, for implementing the full set of data model capabilities. In addition, the character driver includes support for asynchronous (non-blocking) I/O, allowing select( ) to be used for timed waiting for updates from an access context.

In addition, a more friendly C-style interface may be provided through a shared library (which may be implemented using the character driver interfaces). An object-based C++ style interface may be used for implementation, as well. To allow easy use from scripting environments, several command-line interface tools may be implemented using the C-style library, providing access and modification mechanisms. The exemplary implementation may also include a set of CGI (Common Gateway Interface) modules implementing both query and update XML grammars for the data model. The Appendix depicts an exemplary XML grammar. These grammars may allow a full set of methods for querying the data model and returning subsets of the data model, as well as creating, modifying, and deleting data within the model. These XML-based web interfaces may provide a programmatically friendly way for a Java-based application provided as a GUI implementation, a centralized mass administration tool, and other third party applications to interact with the device implementing the data model. A query CGI may include support for both inputting an XML-based query (as form-data input of a POST) and returning the data in the response, or running pre-canned queries stored on the device and tied to defined URLs. An exemplary implementation may also include support for substitution of values derived from the data model into standard HTML documents using an XML-based macro grammar.

An exemplary implementation may include a custom SNMP subagent, which provides a mechanism for defining tables to the SNMP agent representing the values and metadata slots of variables of a given class. These mappings may provide a means by which variables in the data model, such as sensors and configuration data, can be easily published for access through standard SNMP access mechanisms.

Another exemplary implementation may include mechanisms for generating XML-based reports (using the same grammars as used for the Web Access), and delivering these reports using FTP to an FTP server, HTTP POST-ing (form data delivery) to a remote web server, or SMTP-based e-mail delivery.

A further exemplary implementation may include an application for utilizing the C-style library interface for monitoring data updates, and storing copies of the variables marked as persistent (using the type flags) to an XML-based file encoding. At system restart, this file may be used to drive the data model updates to restore those variables to the state corresponding to the last stored state. This same mechanism can be used for saving and restoring configuration data externally from the device.

The above disclosed subject matter is to be considered illustrative, and not restrictive, and the appended claims are intended to cover all such modifications, enhancements, and other embodiments which fall within the true scope of the present invention. For example, the above data model and journaling application may be implemented on PCs and server systems. Thus, to the maximum extent allowed by law, the scope of the present invention is to be determined by the broadest permissible interpretation of the following claims and their equivalents, and shall not be restricted or limited by the foregoing detailed description, including the APPENDIX.

APPENDIX

XML Grammar (DTD)

```
<!-- Data set schema: used for representing query
  results and presistent data sets. The encoding is
  used to represent the definitions, values, and
  metadata of a set of variables defined in the
  nbVariables data manager -->
<!ELEMENT variable-set ((classdef|variable|query-error)*)>
<!ATTLIST variable-set
    privset CDATA #IMPLIED
    timestamp CDATA #IMPLIED
    time CDATA #IMPLIED>
<!-- variable class element -->
<!ELEMENT classdef (metadata*)>
<!ATTLIST classdef
    class CDATA #REQUIRED
    parent CDATA ""
    readpriv CDATA "0"
    writepriv CDATA "0">
<!-- variable instance element -->
<!ELEMENT variable ((null | i32-val | u32-val | i64-val |
    u64-val | float-val | double-val | bool-val |
    utc-val | utc-msec-val | string-val | password-val | octet-val |
    string-list-val | nls-string-val | nls-string-list-val |
    varid-val | varid-list-val | struct-val), metadata*)>
<!-- variable attributes:
    varid is LUID of variable (unless globalid="yes")
    class is class ID string -->
<!ATTLIST variable
    varid CDATA #REQUIRED
    guid CDATA #IMPLIED
    class CDATA ""
    classpath CDATA ""
    readonly (yes | no) "no"
    constant (yes | no) "no"
    persistent (yes | no) "no"
    val-transient (yes | no) "no"
    remote (yes | no) "no"
    globalid (yes | no) "no"
    nodelete (yes | no) "no">
<!-- null type value -->
<!ELEMENT null-val EMPTY>
<!-- 32-bit integer value : value is decimal integer string -->
<!ELEMENT i32-val (#PCDATA)>
<!ATTLIST i32-val
    isnull (yes | no) "no">
<!-- 32-bit unsigned integer value : value is decimal integer
    string -->
<!ELEMENT u32-val (#PCDATA)>
```

APPENDIX-continued

XML Grammar (DTD)

```
<!ATTLIST u32-val
    isnull (yes | no) "no">
<!-- 64-bit integer value : value is decimal integer string -->
<!ELEMENT i64-val (#PCDATA)>
<!ATTLIST i64-val
    isnull (yes | no) "no">
<!-- 64-bit unsigned integer value : value is decimal integer
    string -->
<!ELEMENT u64-val (#PCDATA)>
<!ATTLIST u64-val
    isnull (yes | no) "no">
<!-- 32-bit float value : value is decimal floating-point
    string -->
<!ELEMENT float-val (#PCDATA)>
<!ATTLIST float-val
    isnull (yes | no) "no">
<!-- 64-bit float value : value is decimal integer string -->
<!ELEMENT double-val (#PCDATA)>
<!ATTLIST double-val
    isnull (yes | no) "no">
<!-- boolean value : value is in val attribute -->
<!ELEMENT bool-val EMPTY>
<!ATTLIST bool-val
    val (true | false) "false"
    isnull (yes | no) "no">
<!-- 32-bit utc time value : value is decimal integer
    string -->
<!ELEMENT utc-val (#PCDATA)>
<!ATTLIST utc-val
    isnull (yes | no) "no">
<!-- 64-bit utc milliseconds value : value is decimal integer
    string -->
<!ELEMENT utc-msec-val (#PCDATA)>
<!ATTLIST utc-msec-val
    isnull (yes | no) "no">
<!-- string value - value is string -->
<!ELEMENT string-val (#PCDATA)>
<!ATTLIST string-val
    isnull (yes | no) "no">
<!-- password value - value is string -->
<!ELEMENT password-val (#PCDATA)>
<!ATTLIST password-val
    isnull (yes | no) "no">
<!-- octet string value - value is sequence of hex digits (2 per byte)
    string (i.e. F002CD) -->
<!ELEMENT octet-val (#PCDATA)>
<!ATTLIST octet-val
    isnull (yes | no) "no">
<!-- string list value - value is list of <string-val> -->
<!ELEMENT string-list-val (string-val*)>
<!ATTLIST string-list-val
    isnull (yes | no) "no">
<!-- NLS string value - value is string -->
<!ELEMENT nls-string-val (#PCDATA)>
<!ATTLIST nls-string-val
    isnull (yes | no) "no"
    raw CDATA #REQUIRED>
<!-- NLS string list value - value is list of <nls-string-val> -->
<!ELEMENT nls-string-list-val (nls-string-val*)>
<!ATTLIST nls-string-list-val
    isnull (yes | no) "no">
<!-- variable ID value - value is string variable ID -->
<!ELEMENT varid-val (#PCDATA)>
<!ATTLIST varid-val
    isnull (yes | no) "no">
<!-- variable ID list value - value is list of <varid-val> -->
<!ELEMENT varid-list-val (varid-val*)>
<!ATTLIST varid-list-val
    isnull (yes | no) "no">
<!-- structure value - value is list of <struct-element> -->
<!ELEMENT struct-val (struct-element*)>
<!ATTLIST struct-val
    isnull (yes | no) "no">
<!-- structure element -->
<!ELEMENT struct-element (null | i32-val | u32-val | i64-val |
    u64-val | float-val | double-val | bool-val |
    utc-val | utc-msec-val | string-val | password-val | octet-val |
```

APPENDIX-continued

XML Grammar (DTD)

```
        string-list-val | nls-string-val | nls-string-list-val |
        varid-val | varid-list-val | struct-val)>
<!ATTLIST struct-element
        fieldid CDATA #REQUIRED>
<!-- metadata record -->
<!ELEMENT metadata (null | i32-val | u32-val | i64-val |
        u64-val | float-val | double-val | bool-val |
        utc-val | utc-msec-val | string-val | password-val | octet-val |
        string-list-val | nls-string-val | nls-string-list-val |
        varid-val | varid-list-val | struct-val)>
<!ATTLIST metadata
        slotid CDATA #REQUIRED
        isclassdef (yes | no) "no">
<!-- query root element -->
<!ELEMENT variable-query ((result-filter | id-query | type-class-
        query)*)>
<!-- Result filter - controls what data from variables are returned -
        filter values apply until next result-filter tag is encountered.
        incvalue="yes" means include the value of each matching object
        incclass="yes" means include the "class=" attribute for each object
        incclasspath="yes" means include the "classpath=" attribute for each
        inctypeflags="yes" means include the type flag attributes (persistent,
        readonly)
        incguid="yes" means include the guid= parameter for each variable
        resolvenls="yes" means include the locale-resolved version of any
        nls-string
        follow-varid-val="yes" means also get any objects referenced by
                the varid or varid-list typed value of a matching object -->
<!ELEMENT result-filter (incmeta*)>
<!ATTLIST result-filter
        incvalue (yes | no) "yes"
        incclass (yes | no) "no"
        incclasspath (yes | no) "yes"
        inctypeflags (yes | no) "no"
        incguid (yes | no) "no"
        resolvenls (yes | no) "yes"
        follow-varid-val (yes | no) "no">
<!-- Result filter tag for requesting specific metadata slot - if slotid
        is '*' or empty, request is for all metadata slots. The type of the
        slot requested can also be specified. If the slot is a varid or
        varid-list and "follow-slot" is "yes", the variable that is
        referenced by the slot should also be returned. -->
<!ELEMENT incmeta EMPTY>
<!ATTLIST incmeta
        slotid CDATA "*"
        type (null | i32 | u32 | i64 | u64 | float | double | bool |
                utc | utc-msec | string | password | octet | string-list | nls-string |
                nls-string-list | varid | varid-list | struct | any) "any"
        incclassdef (yes | no) "yes"
        follow-slot (yes | no) "no">
<!-- Request for specific variable (with given varid: varid can be
        a space or comma separated list of IDs) -->
<!ELEMENT id-query EMPTY>
<!ATTLIST id-query
        varid CDATA #REQUIRED
        realtime (yes | no) "no">
<!-- Request all variables with given class and given type flag values
        Nested <metadata> tags can be used to provide additional "must
        match" constraints -->
<!ELEMENT type-class-query (metadata*)>
<!ATTLIST type-class-query
        class CDATA ""
        readonly (yes | no | any) "any"
        constant (yes | no | any) "any"
        persistent (yes | no | any) "any"
        val-transient (yes | no | any) "any"
        remote (yes | no | any) "any"
        globalid (yes | no | any) "any"
        nodelete (yes | no | any) "any"
        realtime (yes | no) "no">
<!-- <query-error> is used to report processing errors in the <variable-set>
        response to a <variable-query> request. Zero or more can be returned
        inline with other successful results. error-code attribute is used
        for error condition identifier string (nls-neutral). raw is used to
        report a "raw" version of the error message (if available), in the same
        format as used for nls-string-val tokens. -->
<!ELEMENT query-error (#PCDATA)>
<!ATTLIST query-error
        error-code CDATA #REQUIRED
        raw CDATA "">
<!-- <variable-write> is the root element for variable add/modify/delete
        requests. All the updates withing the <variable-update> are applied
        as a single transaction. <classdef> is used to add new class
        definitions. 'results' attribute is used to control if the response to the
        <variable-write> (a <variable-write-results> document) should
        include all results, only errors, or no results at all. rollback-on-error is
        used to control whether or not the whole transaction should be
        cancelled (rolled-back) if any error is reported -->
<!ELEMENT variable-write ((variable-add | variable-update | variable-
        delete | meta-add | meta-update | meta-delete | classdef)*)>
<!ATTLIST variable-write
        result (all | only-errors | none) "all"
        rollback-on-error (yes | no) "no">
<!-- <variable-add> is used to create a new variable instance: the
        updateifexists attribute can be used to do an update instead when the
        variable already exists. -->
<!ELEMENT variable-add (variable*)>
<!ATTLIST variable-add
        updateifexists (yes | no) "no">
<!-- <variable-update> is used to update existing variables: the class and
        typeflags in the <variable> elements are ignored. Also, the type of
        the data must match the existing variable. Any metadata slots defined
        are added if they don't exist and updated if they do.
        if mergestruct=yes, update to structures are merge updates
        (field-level add/update), else structure is replaced -->
<!ELEMENT variable-update (variable*)>
<!ATTLIST variable-update
        mergestruct (yes | no) "no">
<!-- <variable-delete> is used to delete a variable and its associated
        metadata -->
<!ELEMENT variable-delete EMPTY>
<!ATTLIST variable-delete
        varid CDATA #REQUIRED>
<!-- <meta-add> is used to add a new metadata slot to an existing variable.
        The updateifexists attribute controls whether the slot should be
        updated if it already exists -->
<!ELEMENT meta-add (metadata*)>
<!ATTLIST meta-add
        varid CDATA #REQUIRED
        updateifexists (yes | no) "no">
<!-- <meta-update> is used to update an existing slot of an existing
        variable. -->
<!ELEMENT meta-update (metadata*)>
<!ATTLIST meta-update
        varid CDATA #REQUIRED>
<!-- <meta-delete> is used to delete an existing slot of an existing
        variable. -->
<!ELEMENT meta-delete EMPTY>
<!ATTLIST meta-delete
        varid CDATA #REQUIRED
        slotid CDATA #REQUIRED
        type (null | i32 | u32 | i64 | u64 | float | double | bool |
                utc | utc-msec | string | password | octet | string-list | nls-string |
                nls-string-list | varid | varid-list | struct) #REQUIRED>
<!-- <variable-write-results> is the root element for reporting the
        results of a <variable-write> command sequence -->
<!ELEMENT variable-write-results (variable-write-result*)>
<!-- <variable-write-result> is used to report the result of a single
        add/update/delete operation. Note that some operations (such
        as any operation that modifies a variable and its metadata values)
        are actually a sequence of operations (a variable add/update plus
        one meta-add (update-if-exists=yes) for each metadata slot). -->
<!ELEMENT variable-write-result EMPTY>
<!ATTLIST variable-write-result
        op (variable-add | variable-update | variable-delete |
                meta-add | meta-update | meta-delete | classdef | parse |
                transaction) #REQUIRED
        varid CDATA ""
        slotid CDATA ""
        slottype (null | i32 | u32 | i64 | u64 | float | double | bool |
                utc | utc-msec | string | password | octet | string-list | nls-string |
                nls-string-list | varid | varid-list | struct) "null"
        class CDATA ""
        result (success | does-not-exist | already-exists | not-permitted |
```

APPENDIX-continued

XML Grammar (DTD)

type-mismatch | read-only | parse-error | general-error | rollback) "success">

What is claimed is:

1. A system for maintaining data integrity, the system comprising:
a monitoring appliance including:
a memory;
at least one sensor selected from a group comprising a temperature sensor, a humidity sensor and an airflow sensor;
at least one processor coupled to the memory and the at least one sensor;
a kernel-mode device driver executable by the at least one processor and configured to create a journal data model including:
at least one variable definition associated with the at least one sensor, the at least one variable definition including an oldest update field and a latest update field;
a doubly-linked list of variable update records storing one or more readings from the at least one sensor, each variable update record of the doubly-linked list of variable update records including a variable value that indicates a sensor reading from the at least one sensor; and
at least one context record having an associated current timestamp field and a context update field pointing to a first variable update record of the doubly-linked list of variable update records,
wherein the at least one variable definition is associated with a first variable, each of the doubly-linked list of variable update records is associated with the first variable, the oldest update field of the at least one variable definition points to a second variable update record of the doubly-linked list of variable update records, and the latest update field of the at least one variable definition points to a third variable update record of the doubly-linked list of variable update records.

2. The system of claim 1, wherein each variable definition further comprises an identification string, and the journal data model further comprising a hash table with records hashed by the identification string.

3. The system of claim 1, wherein each variable definition further comprises a class pointer, the class pointer indicating a class and permitting inheritance of class attributes.

4. The system of claim 1, wherein each variable definition further comprises a creation timestamp.

5. The system of claim 1, wherein each variable definition further comprises a flag.

6. The system of claim 5, wherein the flag indicates an attribute selected from the group consisting of a read-only flag, a constant flag, and an undeletable flag.

7. The system of claim 5, wherein the flag indicates persistence attribute.

8. The system of claim 1, wherein each variable update record comprises a variable update timestamp.

9. The system of claim 1, wherein the kernel-mode device driver is further configured to discard each of the doubly-linked list of variable update records that have a timestamp older than the oldest timestamp of interest.

10. The system of claim 1, wherein each variable update record of the doubly-linked list of variable update records is configured to store environmental data.

11. The system of claim 2, wherein the kernel-mode device driver is further configured to:
find the at least one variable definition using the hash table;
access the oldest update field of the at least one variable definition; and
report the variable value of the second variable update record to a reader.

12. A method for maintaining data structures by a kernel-mode device driver stored in a memory of a monitoring appliance, the monitoring appliance including at least one processor coupled to at least one sensor selected from a group comprising a temperature sensor, a humidity sensor and an airflow sensor, the method comprising:
receiving, by the kernel-mode device driver, environmental data from the at least one sensor via a sensor interface;
storing, in the memory by the kernel-mode device driver, at least one variable definition having an associated variable and including an oldest update field and a latest update field, the associated variable having a data type suitable for storing the environmental data, the data type corresponding to the at least one sensor;
storing, in the memory by the kernel-mode device driver, a doubly-linked list of variable update records, each variable update record of the doubly-linked list of variable update records including a variable value that indicates a sensor reading from the at least one sensor; and
storing, in the memory by the kernel-mode device driver, at least one context record having an associated current timestamp field and a context update field pointing to a first variable update record of the doubly-linked list of variable update records,
wherein the at least one variable definition is associated with a first variable, each of the doubly-linked list of variable update records is associated with the first variable, the oldest update field of the at least one variable definition points to a second variable update record of the doubly-linked list of variable update records, and the latest update field of the at least one variable definition points to a third variable update record of the doubly-linked list of variable update records.

13. The method of claim 12, wherein storing, in the memory, the at least one variable definition comprises storing, in the at least one variable definition, an identification string, and the method further includes storing, in the memory, a hash table with records hashed by the identification string.

14. The method of claim 12, wherein storing, in the memory, the at least one variable definition comprises storing, in the at least one variable definition, a class pointer, the class pointer indicating a class and permitting inheritance of class attributes.

15. The method of claim 12, wherein storing, in the memory, the at least one variable definition comprises storing, in the at least one variable definition, a creation timestamp.

16. The method of claim 12, wherein storing, in the memory, the at least one variable definition comprises storing, in the at least one variable definition, a flag.

17. The method of claim 16, wherein storing, in the at least one variable definition, the flag comprises storing a flag that indicates an attribute selected from the group consisting of a read-only flag, a constant flag, and an undeletable flag.

18. The method of claim 16, wherein storing, in the at least one variable definition, the flag comprises storing a flag that indicates a persistence attribute.

19. The method of claim 12, wherein storing, in the memory, the doubly-linked list of variable update records comprises storing, in each variable update record of the doubly-linked list of variable update records, a variable update timestamp.

20. The method of claim 12, further comprising discarding, from the memory, each of the doubly-linked list of variable update records that have a timestamp older than the oldest timestamp of interest.

21. A memory having stored thereon sequences of instructions that implement a kernel-mode device driver configured to maintain data structures, the sequences of instructions including instructions that will cause at least one processor to:
  receive, via the kernel-mode device driver, environmental data from at least one sensor via a sensor interface;
  store, via the kernel-mode device driver, at least one variable definition having an associated variable and including an oldest update field and a latest update field, the associated variable having a data type suitable for storing the environmental data, the data type corresponding to the at least one sensor;
  store, via the kernel-mode device driver, a doubly-linked list of variable update records, each variable update record of the doubly-linked list of variable update records including a variable value that indicates a sensor reading from the at least one sensor; and
  store, via the kernel-mode device driver, at least one context record having an associated current timestamp field and a context update field pointing to a first variable update record of the doubly-linked list of variable update records,
  wherein the memory is included within a monitoring appliance and the at least one variable definition is associated with a first variable, each of the doubly-linked list of variable update records is associated with the first variable, the oldest update field of the at least one variable definition points to a second variable update record of the doubly-linked list of variable update records, and the latest update field of the at least one variable definition points to a third variable update record of the doubly-linked list of variable update records.

22. The memory of claim 21, further including instructions that will cause the at least one processor to discard each of the doubly-linked list of variable update records that have a timestamp older than the oldest timestamp of interest.

* * * * *